United States Patent [19]

Schmidt et al.

[11] Patent Number: 4,457,947

[45] Date of Patent: Jul. 3, 1984

[54] AUTOMATIC COOKING METHOD

[75] Inventors: Dieter Schmidt; Jasef Buschor, both of Santa Clara, Calif., and Wayne K. Spillnev, Benton, Wash.

[73] Assignee: UI Group, Inc., Boardman, Oreg.

[21] Appl. No.: 464,207

[22] Filed: Feb. 7, 1983

[51] Int. Cl.³ .............................................. A23L 1/01
[52] U.S. Cl. ..................................... 426/438; 99/356; 99/407; 426/509
[58] Field of Search ......................... 99/336, 356, 407; 426/112, 113, 114, 115, 232, 233, 438, 409

[56] References Cited

U.S. PATENT DOCUMENTS 3,218,957 11/1965 Fernell ............................... 99/356 X
3,667,373 6/1972 Sicher et al. ........................... 99/407
4,359,935 11/1982 Murray ............................... 99/356 X Primary Examiner—Arthur L. Corbin
Attorney, Agent, or Firm—Seed and Berry

[57] ABSTRACT

A consumer operated frying machine receives food in an open-top container, transfers the food to a frying station for cooking in hot oil, and returns the cooked food to its original container for consumption. Cooking oil is continuously heated, filtered and recirculated through the frying station for improved cooking. A dumping mechanism provides a means to drain excess oil from the cooked food and oscillates to loosen food products which may adhere to the machine during cooking. A sealing lid and air replenishment and filtration system combine to prevent undesirable cooking odors from entering the surrounding environment.

6 Claims, 16 Drawing Figures

AUTOMATIC COOKING METHOD

DESCRIPTION

1. Technical Field

This invention relates to an apparatus and a method for automatically frying individual portions of food products.

2. Background Art

Traditionally, deep-fat fried or "french fried" foods have been prepared by placing a large quantity of food in a frying basket and immersing it in a receptacle of hot oil. When the food has fried to the degree desired, the basket is then removed from the hot oil. In commercial operations, a rack is often provided above the oil receptacle for securing the basket. Immediately after removal of food from the oil, the basket can be hung on the rack to allow the excess oil to drain from the fried food. Heat rising from the oil retards solidification of the excess oil on the food and consequently aids it in draining from the food. The excess oil will fall into the receptacle for further use. Commercial basket racks are often designed to allow a basket hung on the rack to be rocked back and forth to facilitate drainage of the excess oil and loosen food portions which may attach to the basket during frying.

French fried potatoes and other deep-fat fried foods have generally not been available at locations other than restaurants having traditional french frying setups.

Providing a traditional french fry setup at non-restaurant locations is impractical. The cost of providing a full time cook would make the french fry product prohibitively expensive, and a traditional setup cannot be safely left unattended to be operated by a consumer. Additionally, large venting setups are necessary to avoid excessive odors and continual maintenance of such setups is required.

Machines for automatically frying individual portions of food have recently been developed. Existing machines of this type require that the consumer dump a frozen food product from a single portion container into a feed chute on the top of the machine. The chute guides the food product into a frying vat much as in prior restaurant french fryers where it will be fried in hot oil. After cooking, the fried food product is removed from the vat and dropped into a discharge chute which leads to an output location where the consumer has placed a container to catch the food products.

Although existing machines do permit consumers to french fry single portions of food products at non-restaurant locations, several problems exist with the prior machines. Firstly, when such machines are used to fry frozen food products, as they normally are, the temperature of the frying oil will drop drastically (up to 60° F.) when the oil first contacts the frozen food. This temperature drop is undesirable as frying below optimum temperature results in a poorly fried product which retains more oil than desired. Secondly, existing machines do not adequately drain the excess oil from the fried food before delivering it to the consumer. Not only does the consumer ingest extra oil, but the finished fried foods looks greasy. Also, the extra oil falls onto the cup holder portion of the machine or otherwise passes into hard to clean areas of the machine. Thirdly, existing machines do not properly control or vent fumes and odors which result from the frying oil. As it is not practical to vent externally of a building, excessive odor will leave an undesirable cooking smell in the room.

One difficult aspect of deep fat frying of frozen foods is the drastic temperature drop which occurs in the oil when the frozen food product is immersed. It is desirable to cook the food product at a relatively constant temperature, for example, 320° F. If the frozen food can substantially effect the temperature of the oil then the undesirable large temperature drop occurs. U.S. Pat. No. 3,210,193 discloses an attempted solution to the temperature drop problem. In this patent a small reservoir of very high temperature oil such as 395° F. is responsive to a thermostatic demand in a larger cooking vat to pump the high temperature oil into the filled vat and attempt to maintain a constant temperature when frozen products are added. This type of system, however, is undesirable as it is too dependent upon the thermostatic control and more importantly requires heating of the oil to temperatures that result in rapid degradation of the oil.

It can be seen then that there is a demand for an improved machine and method which will permit consumers to deep-fat fry individual food portions without the disadvantages of existing machines.

DISCLOSURE OF INVENTION

It is an object of this invention to provide an automatic french frying machine which will cook individual food portions at an optimum temperature with little oil degradation and with minimum operator activity.

It is another object of this invention to provide an automatic french frying machine which will reduce the amount of excess oil remaining on the food fried by the machine.

It is another object of this invention to provide an automatic french frying machine which reduces accumulation of food remaining in the machine.

It is another object to provide an automatic french frying machine which will reduce the emission of cooking odors into the surrounding environment.

It is another object to provide a method and apparatus for storing, handling, loading, cooking, unloading and serving individual-sized portions of the food product.

It is another object to provide a method of storing, cooking, and serving individual-sized portions of food which utilizes a unique cartridge for storage, transporting, processing and serving the individual size portion of the food.

These and other objects are obtained by providing a french frying machine which receives frozen food in an open-top container, automatically transfers the food to a frying station for cooking in the hot oil, and automatically returns the food to its original container for consumption. An open-top, individual-sized container of food is inserted by the consumer into a specially shaped receptacle. When the machine is actuated, a linkage mechanism pivots the receptacle over the frying station to dump the food into a frying basket contained in a small volume cooking vat. The open-top container and receptacle are then returned to their original position. A volume of hot oil many times larger than the cooking vat is then continuously circulated through the small cooking vat to ensure that an almost constant frying temperature is maintained throughout the cooking operation even though the frozen product is being cooked. The circulating oil is passed through a removable filter to catch any food particles which may be present in the oil. When frying is complete, the linkage mechanism automatically lifts the frying basket out of the cooking vat. The basket is held above the cooking vat to allow the excess oil to drain and then pivoted over the receptacle to dump the cooked food back into its original container. After dumping, the basket is rocked over the container to dislodge any food particles which may adhere to the basket. The consumer may then remove the cartridge with its cooked food from the receptacle for consumption.

In the preferred embodiment, oil absorbed by the food is periodically replenished to the reservoir from a supply within the machine. Spent oil may be periodically removed based upon the extent of its use and the time period within the machine.

The frying station includes a lid which seals the station from the surrounding environment at all times except during insertion and removal of the food into the frying station. This features reduces the number of oil fumes which are emitted into the machine surrounding the cooking vat and reservoir. A specially designed air filtration and circulation system easily treats the resulting reduced volume of fumes to eliminate odors.

A particularly unique feature of the invention is the use of a cartridge food holder that stores an individual-sized portion frozen food product, is used as the shipping container, is the display carton at the users facility, contains instructions and/or nutritional information, is then, after opening, loaded into the frying machine and is automatically dumped, then refilled with the cooked product and becomes the serving container for the consumer to carry and eat the food. This feature is to be contrasted to conventional commercially practical french frying setups in which a large volume of frozen product is remove from a large box or bag, cooked and then repackaged into individual bags or boxes. This is also to be contrasted to earlier experimental individual portion fryers that required the consumer to dump the product into the cooking vat and then re-position the container for later catching the cooked product when again manually discharged.

Still another unique feature is the use of a large reservoir of oil heated slightly above the desired cooking temperature to flood the product held in a cooking vat sized to cook a small, individual-sized portion of food. By continuously recirculating the hot oil in the small cooking vat from the large heat source of the large reservoir, a very small temperature drop occurs in the oil while in the cooking vat irrespective of the temperature of the frozen food product. This occurs, of course, because a large number of BTU's can be added to the food product without affecting the temperature of the oil in the large reservoir. As a result cooking is fast, at uniform temperature and at an oil temperature not high enough to cause rapid degradation.

BEST MODE FOR CARRYING OUT THE INVENTION

An automatic french frying machine 10 comprising a preferred embodiment of the present invention is illustrated in FIGS. 1–17. It is designed for use with food F stored in a specially designed container C, and allows a consumer to insert the container C into the machine 10, actuate the machine for the type of food to be fried, and have the products automatically french fried and returned to its original container C.

Figure 6:
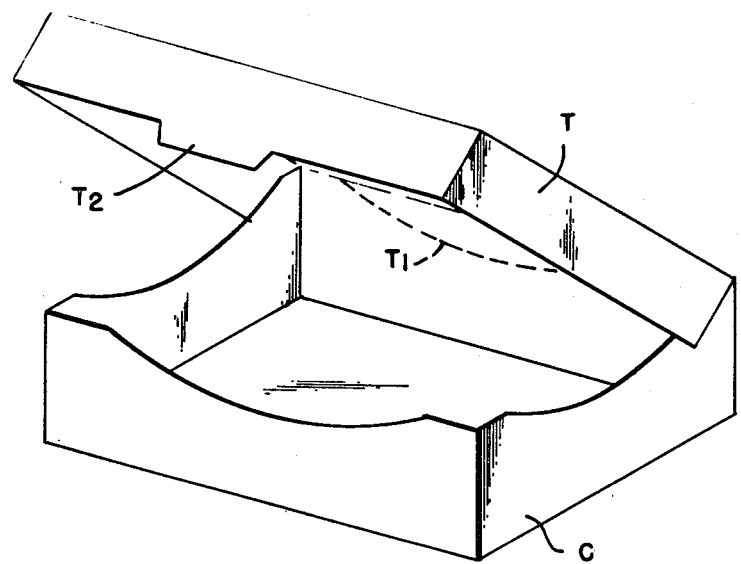
FIG. 6 is an isometric view of a food cartridge for use with the receptacle of FIG. 4.
Figure 7:
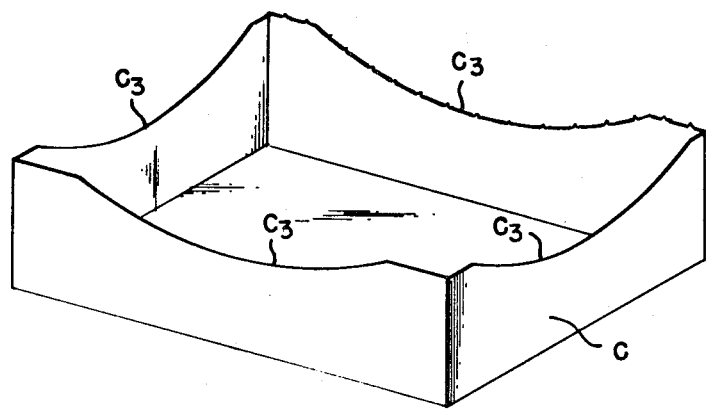
FIG. 7 is an isometric view of the container or cartridge of FIG. 6 with the top removed for insertion into the automatic french frying machine of this invention.
Figure 8:
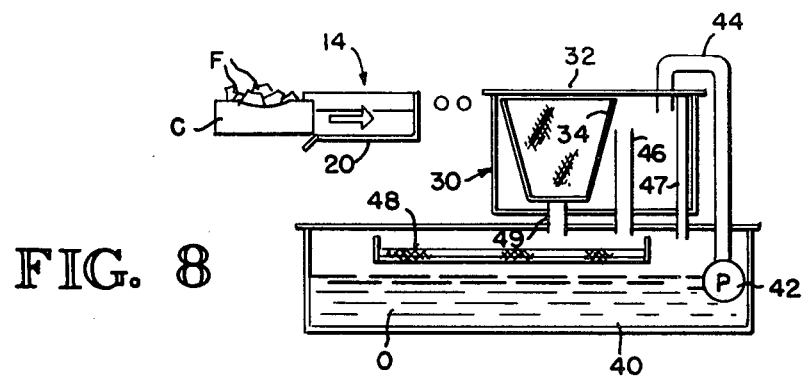
FIGS. 8, 9, and 10 are side elevation views of the receptacle, frying station, and oil reservoirs, schematically illustrating the feeding, dumping of uncooked food product into the frying station, and cooking operations.

The automatic french frying machine 10 is designed to be used with food stored within a cartridge or container C which is illustrated in FIG. 6 and described in more detail below. The top T of the container C is removed, leaving an open-top container C as illustrated in FIG. 7. To french fry food stored within the then open-top container C, a consumer need only raise a sliding door 12 (see FIG. 1) and insert the container C into a container receptacle 20 positioned at a consumer access station 14 behind the sliding door 12. The door is latched open and latched closed to prevent access during a cooking cycle by a solenoid 13.

Figure 9:
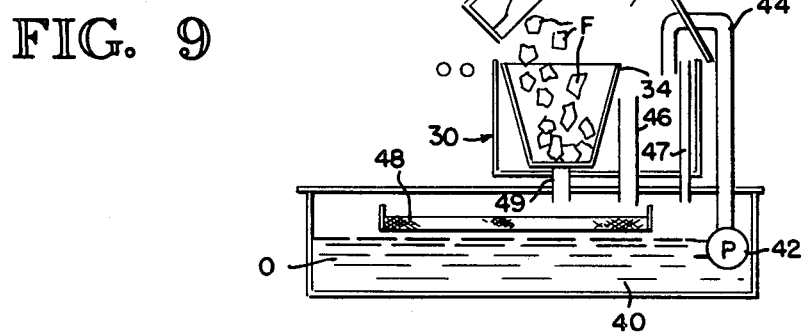
Figure 10:
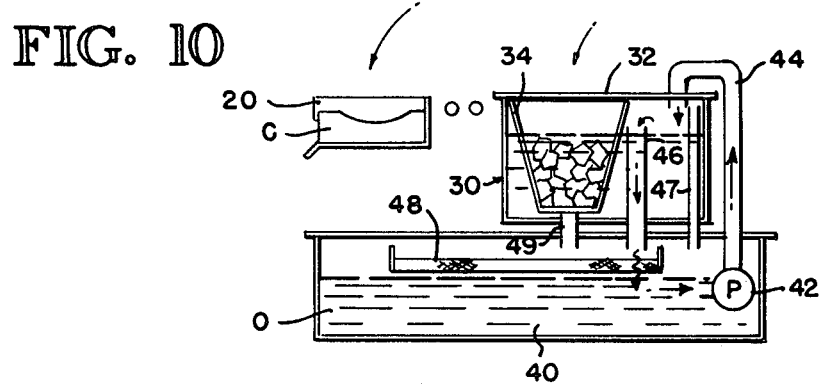

As illustrated in FIGS. 9 and 10, when the automatic french frying machine is activated, a linkage mechanism 60 (described in detail below) opens the lid 32 of a frying vat 30. The frying basket is then raised to open the bottom drain 49 (described below) thereby draining any cooking oil in the frying vat. The basket is then lowered into place, and the container of food is pivoted over the basket to dump the food therein. (See FIG. 9). The linkage mechanism then returns the container receptacle and the container C to the consumer access station 14 and closes the lid on the frying vat. A pump 42 is then actuated to pump hot cooking oil from an oil reservoir 40 through an inflow spout 44 to the frying vat 30. An overflow drain 46 allows continuous circulation of hot oil during the cooking process. As seen in FIG. 9, oil passing through the overflow drain will pass through filter 48 and into the oil reservoir for heating and recirculation. When cooking is complete, a timer will shut off the pump and actuate the linkage mechanism to open the cooking vat lid and raise the frying basket out of the frying vat 30.

Figure 12:
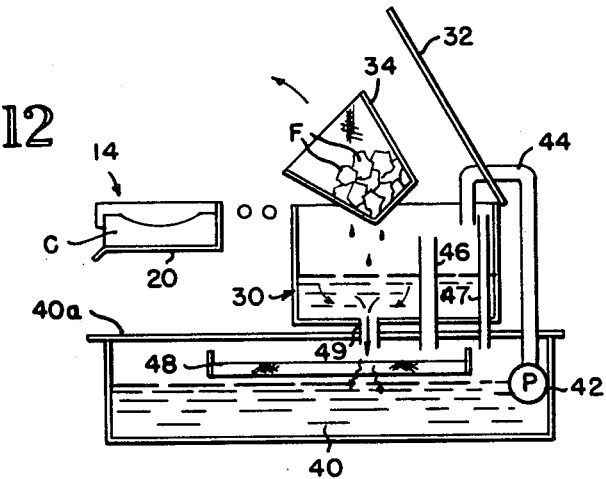
FIGS. 12, and 13 are side elevation views of the receptacle, frying station, and oil reservoirs, schematically illustrating the drainage of excess oil from the cooked food and dumping of the cooked food product back into the container held within the receptacle respectively.

In the preferred embodiment described herein, the motor driving the linkage mechanism 60 is programmed to momentarily stop the basket of cooked food above the frying vat to allow excess oil to drain from the food. The frying basket includes a drain 34a which seals the bottom drain 49 when the frying basket is in a lowered position. Thus, as illustrated in FIG. 12, the cooking oil will begin to drain from the frying vat 30 as soon as the frying basket 34 is raised.

Figure 13:
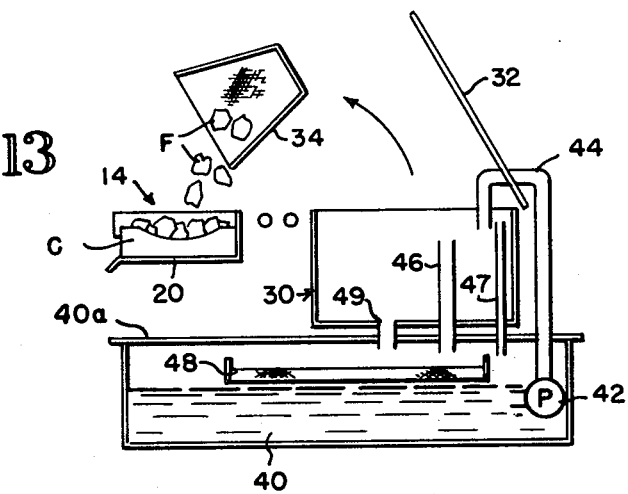

After the frying basket 34 has paused to drain the excess oil, it is pivoted forwardly and inverted over the receptacle by the linkage mechanism to dump the cooked food into its original container C as illustrated in FIG. 13. After the food is dumped, the basket is rocked back and forth over the container to dislodge any food particles which have adhered to the basket during frying. The frying basket 34 is then returned to the frying vat 30 and the lid 32 is closed.

The automatic frying machine 10 of this invention is designed so that the lid of 32 of the frying vat 30 remains closed at all times except when it is necessary to insert and remove food F. This feature preserves the freshness of the cooking oil by minimizing the oxygen available to contact the exposed fluid surface. Additionally, oil condensate, fumes and unpleasant cooking odors leaving the frying vat 30 are reduced. Similarly, the reservoir 40 is also provided with a cover 40a for the same purpose.

The lid 32 and covers 40a combine with an air replenishment and filtration system 100 (FIG. 1) to minimize the cooking odors which are emitted into the environment surrounding the automatic french frying machine 10. The air replenishment and filtration system 100 includes a primary filter section 102 and a secondary filter section 104. A circulation fan 106 pulls air from within the automatic french frying machine 10 through the filter sections. It has been found that by setting circulation fan 106 so that it will completely replenish the air within the automatic french frying machine five times every minute that the air replenishment and filtration system 100 will adequately remove cooking odors within the air before exhausting the air into the surrounding environment.

The primary filter section 102 includes a microcoalescing filter 108 and a media filter (e.g. paper filter) 110 in series. The secondary filter section 104 includes three carbon pack or charcoal filters 112 placed in series.

Figure 1:
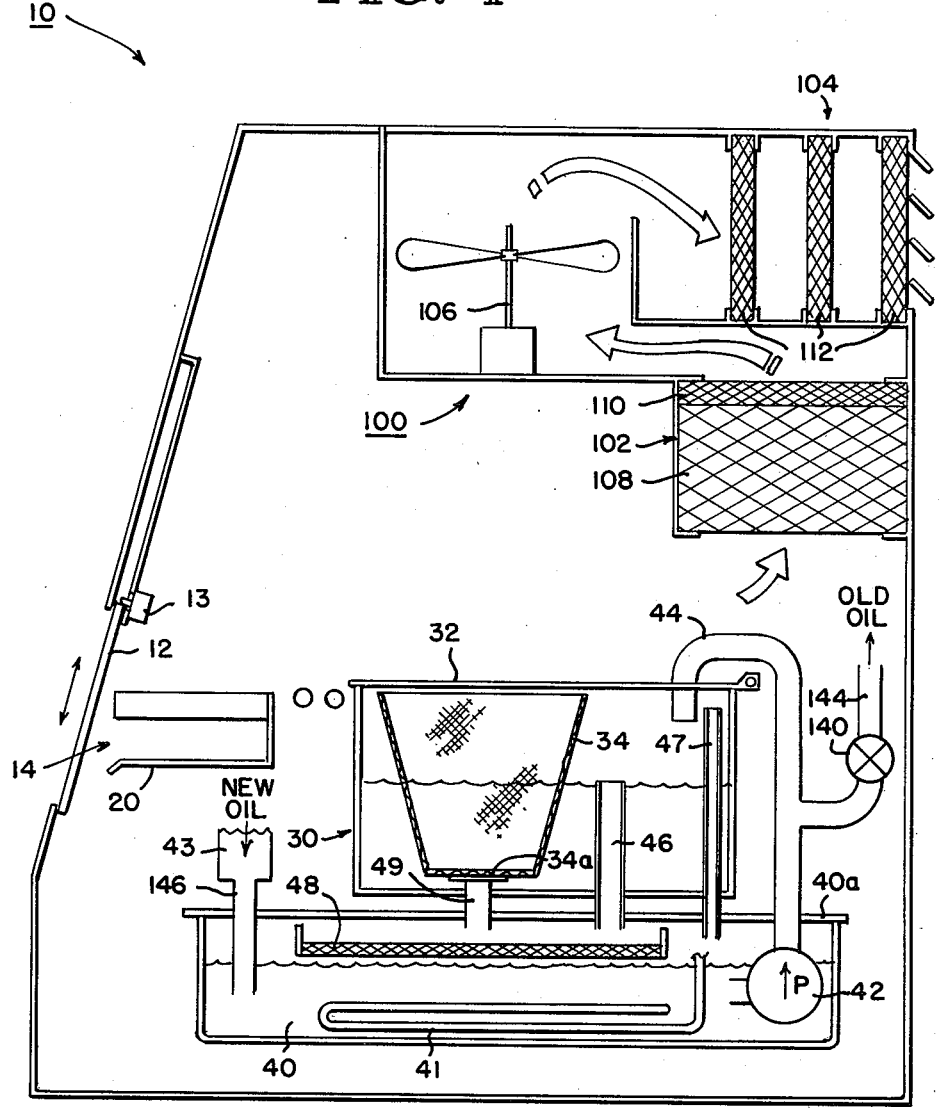
FIG. 1 is a side elevation view illustrating the interior of a preferred embodiment of the automatic french frying machine of this invention, shown here with parts removed for clarity.
Figure 2:
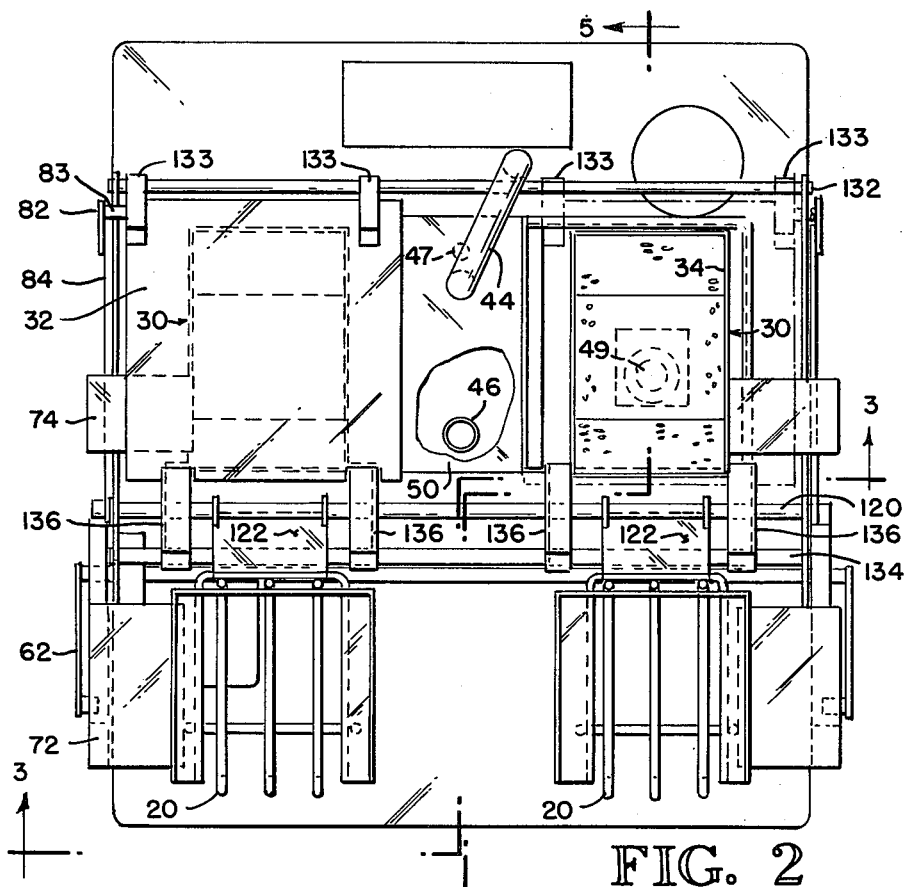
FIG. 2 is a top plan view of a preferred embodiment having two separate frying vats. The right frying vat is shown with the lid removed. The air filtrations and circulation system is omitted for clarity.
Figure 3:
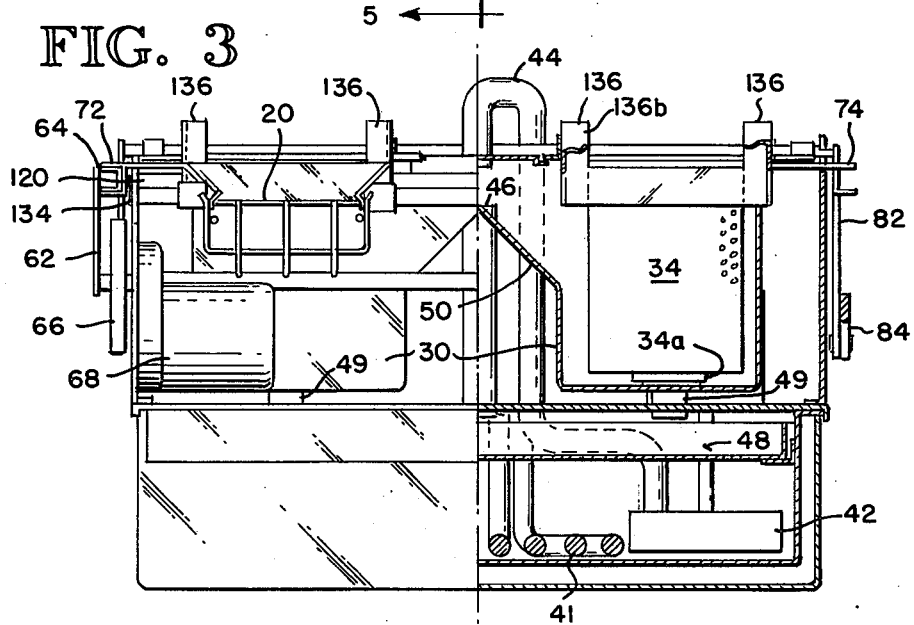
FIG. 3 is a cross-sectional view taken through line 3—3 of FIG. 2.
Figure 5:
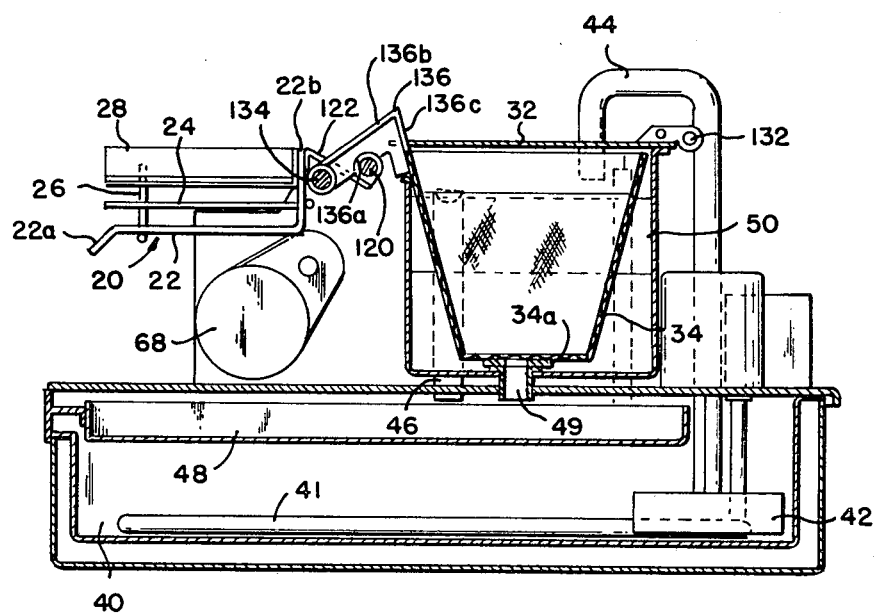
FIG. 5 is a cross-sectional view taken through line 5—5 of FIG. 2.

The details of a preferred embodiment of the invention utilizing two frying vats 30 can be seen in FIGS. 2, 3 and 5. The frying vats are disposed adjacent one another and receive hot oil during the cooking cycle from a common inflow spout 44. The inflow spout is positioned over a sloped angle plate 50 which diverts the oil O from the inflow spout into the two frying vats 30. A single overflow drain 46 is employed for both frying vats. A second safety overflow 47 is provided in the event the first drain 46 is clogged.

During the cooking cycle, the pump 42 will intake cooking oil O which has been heated in the large volume oil reservoir to about 350° F. by heating elements 41 and pump it through the inflow spout 44. From the inflow spout it will flow onto the center of the angle plate and into each frying vat. As seen in FIG. 5, the top of the overflow drain 46 is at a slightly higher elevation than the top of the angle plate. When the oil in either of the frying vats reaches the level of the top of the angle plate, it will flow into the other vat. If the angle plate should fail to divide the flow from the inflow spout 44 equally, the inflowing oil will be directed toward the frying vat 30 with lowest oil level, rather than being recycled immediately through the overflow drain. Similarly, if the cooking cycle in one frying vat is started while the cooking cycle in the other is in progress, the portion of the hot incoming oil which would normally be directed toward the filled (cooking cycle in progress) vat will overflow into the frying vat being filled rather than recycling into the oil reservoir 40. This feature ensures that the small frying vats will fill to their proper cooking level as quickly as possible, and constantly overflow from a large volume flow of hot oil thereby ensuring that the food product within the frying vat 30 will fry at a generally constant temperature for the predetermined time set for that food product.

Oil leaving the frying vat 30 will pass through a screen and paper filter 48 before reentering the oil reservoir 40. In the preferred embodiment illustrated herein, the filter is removably mounted within the automatic french frying machine for easy cleaning. Food particles or other impurities which may enter the oil during frying are thus trapped in the filter which can be easily removed and cleaned.

The pump 42 may also be used to drain the oil from the oil reservoir 40 when it is no longer useable for frying. A valve 140 (FIG. 1) can be opened to allow the spent oil to be pumped out of a drain pipe 144. A fresh oil supply 43 is disposed above the oil reservoir 40 to allow oil to be replaced as oil is absorbed by the food product. A conventional oil level gauge controls the oil supply discharge to maintain the level of the oil in the reservoir.

Each frying vat holds only about two pints of oil whereas the oil reservoir 40 holds about 12 quarts and the oil supply 43 within the machine holds about three quarts. This feature assures a very large hot oil plenum for constant temperature cooking of the food product. The pump runs continuously through a cooking cycle with the length of the cooking cycle being determined automatically by controls preset for particular types of food product.

The Cartridge

The automatic french frying machine 10 of this invention is preferably used with food F stored in containers C such as those illustrated in FIGS. 6 and 7.

FIG. 6 illustrates a cartridge or container with top T still connected. In this form, food F may be stored and frozen or refrigerated (if necessary) until frying is desired. With tops in place the containers may be stacked on top of one another for efficient storage. Perforations T-1 and hot melt glue connect the top to the container to permit the top to be readily removed for insertion of the container into the automatic french frying machine. The top, once lifted from the container, can be replaced on the container to allow the cooked food to be easily transported and kept warm after removal from the automatic french frying machine. The container also includes elevated corners as seen in FIG. 7 to allow securement of the container within the receptacle 20 as described below. Arcuate sections C-3 between the elevated corners C-2 allow the consumer easy access to food stored within the open-top container. The container is thus a multiple purpose cartridge for both frozen and freshly fried foods which is economically attractive because it provides a transportation vehicle, a storage product protection apparatus, a location for point of purchase advertising, preparation instructions, and nutritional instructions, and also functions to handle the food within the machine as well as a serving dish out of the machine.

Figure 4:
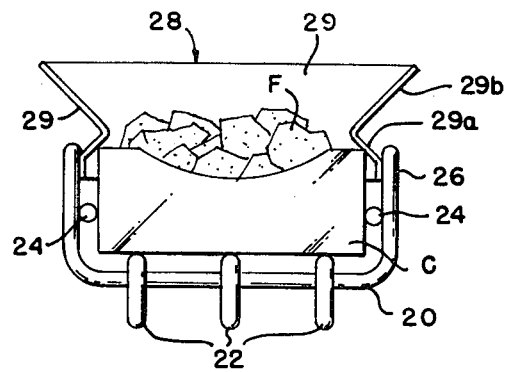
FIG. 4 is a front elevation view of the specially designed receptacle, illustrated here with an open-top container and food product.

A container C of food F is illustrated in FIG. 4 as it appears when inserted into the container receptacle 20. Three L-shaped rails 22 support the bottom and inner end of the container. As best seen in FIG. 5, guides 22a project downwardly and outwardly from the front of the rails 22 to fascilitate insertion of containers into the receptacle. The sides of the container are engaged by side rods 24 carried by L-shaped rail 26. Extending above the container C is a funnel 28. As seen in FIG. 4, the left, right, and back sides of the funnel each include a lower leg 29a which inclines inwardly and upwardly and an upper leg 29b which inclines outwardly and upwardly. The lower legs 29a retain the container in the receptacle when the food is dumped into the frying vat. Additionaly, as the lower leg 29a extends inwardly a distance beyond the edge of the container, it directs any food which may be in the outer regions of the container toward the center of the funnel during dumping to ensure that the food product will enter the frying basket 34. The upper legs 29b are inclined outwardly to direct fried food product into the container when the food is dumped after frying.

The receptacles 20 are each pivotally mounted on a receptacle rod 120 (FIGS. 2, 5 and 17) which extends across the frying machine at a location forward of the frying vats 30 as seen in FIG. 2. Pivot plates 122 rigidly connect the receptacle rod 120 and the rails 22 of each receptacle 20. A basket rod 132 extends across the machine forward of the receptacle rod 120 to pivotally mount the frying baskets 34. As seen in FIG. 2, basket levers 136 are positioned on each side of the pivot plates 122 to mount the body of each frying basket to the basket rod. Each basket lever 136 includes an arcuate surface 136a to allow the basket lever 136 to pivot without being obstructed by the receptable rod 120. The basket levers 136 additionally include an ascending surface 136b and a descending surface 136c to facilitate dumping the uncooked food F into the frying basket 34 as described below. The lids 32 on the frying vats 30 are pivotally mounted on a lid rod 132 which extends across the machine rearward of the frying vats 30 as seen in FIG. 2.

The operation of the linkage mechanism 60 is best illustrated in FIGS. 14–17. A dumping arm 62 is rigidly mounted on a cam wheel 66 at a point X which is positioned eccentrically on the cam wheel 66 and serves at the center of rotation of the cam wheel. The dumping arm includes a roller 64. A motor 68 (FIG. 3) is coupled to the cam wheel 66 for clockwise and counterclockwise rotation of the cam wheel 66 and the dumping arm 62.

Figure 14:
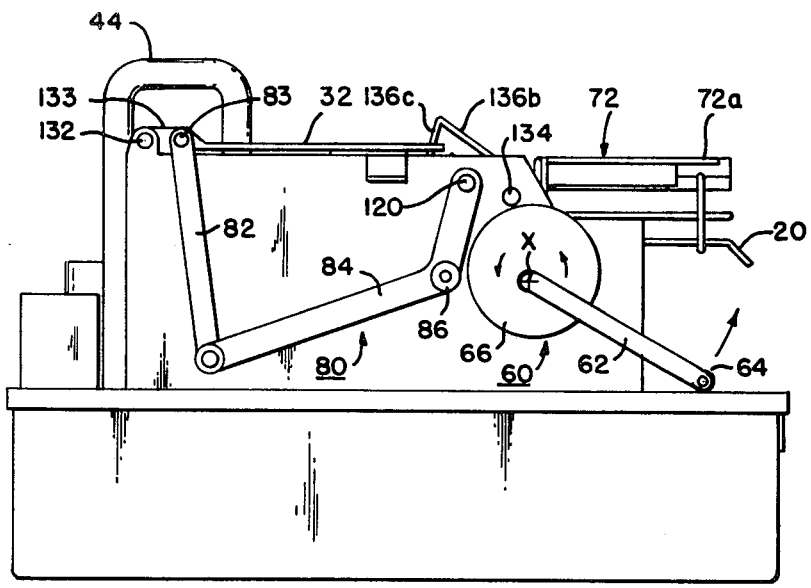
FIGS. 14 and 15 are side elevation views illustrating the linkage mechanism for dumping uncooked food product into the frying station.
Figure 15:
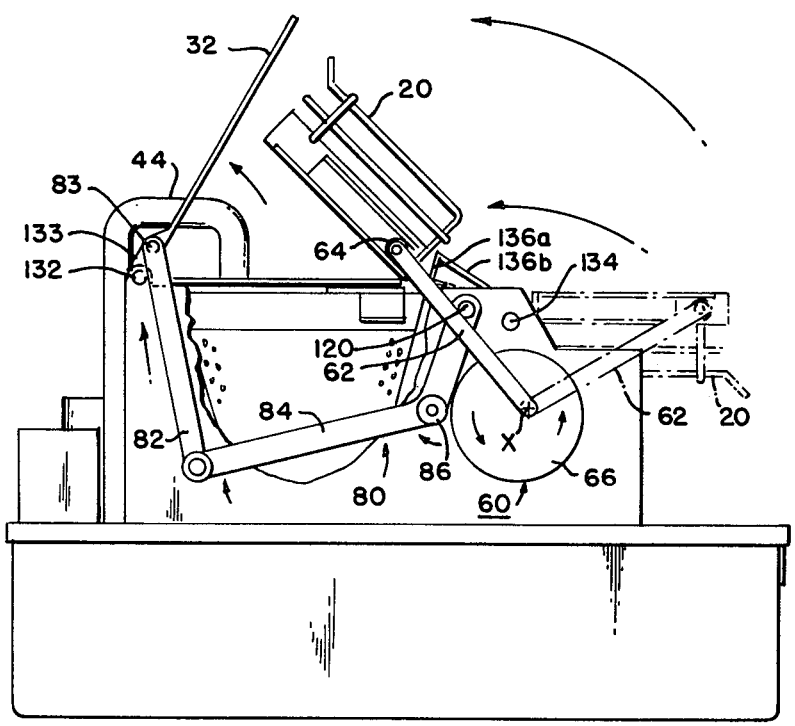

The operational sequence for dumping uncooked food product into the cooking vat 30 is illustrated in FIGS. 14–15. From a starting position wherein the dumping arms 62 are positioned below the receptacle 20, the cam wheel 66 is rotated counterclockwise (FIG. 14). The dumping arm is raised upwardly until the roller 64 engages the top rails 72a of dumping guide 72 which is mounted on the outside of the receptacle. As the cam wheel continues to rotate, the roller 64 will move inwardly along the dumping guide, lifting the container and causing the receptacle to pivot about receptacle rod 120. As seen in FIG. 15, when a sufficient portion of the receptacle 20 has moved over the edge of the ascending surface 136b, the receptacle will rotate about the intersecting edges of the ascending surface 136b and descending surface 136c, causing the food within the container to be dumped into the frying vat 30.

In addition to rotating the dumping arm 62 to dump the food product, the cam wheel 66 simultaneously opens the lid 32 to the frying vat 30. The lid is opened because the cam wheel 66 rotates about an eccentric point X. Counterclockwise rotation of the cam wheel 66 from the position of FIG. 14 to the position of FIG. 15 will cause the cam wheel 66 to engage a lid linkage 80. The lid linkage 80 comprises a lid arm 82 which is pivotally mounted to a pin 83 in lid lever 133 and to one end of an angle arm 84. The angle arm is pivotally mounted at its other end to the receptacle rod 120. The angle arm 84 includes a roller 86 at the elbow of the arm for engaging the cam wheel 66.

When the cam wheel 66 engages the lid linkage 80, it pushes the roller 86 and angle arm 84 rearwardly, which causes the lid arm 82 to move upwardly and open the lid 32. When the lid has been opened and the food has been dumped into the frying vat 30, the rotation of the cam wheel is reversed to return the receptacle to its original location and close the lid.

Figure 16:
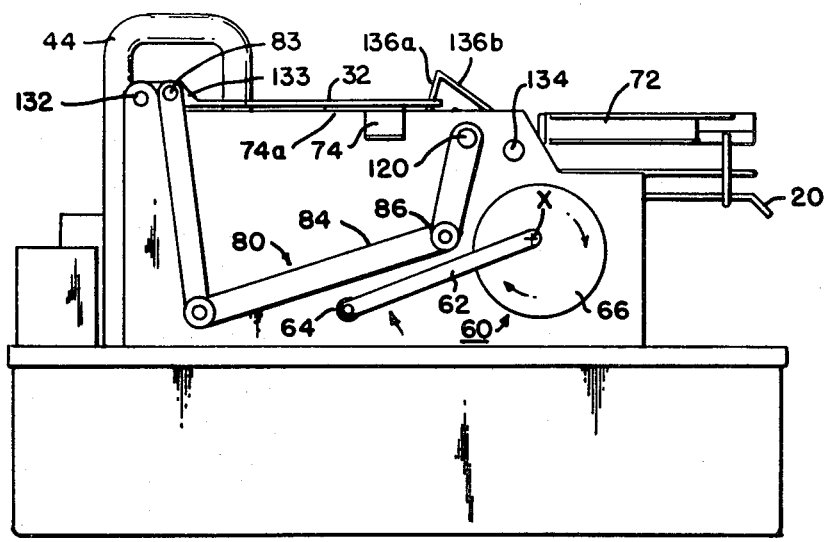
FIGS. 16 and 17 are side elevation views illustrating the linkage mechanism for dumping cooked food product back into the open-top cartridge held within the receptacle.
Figure 17:
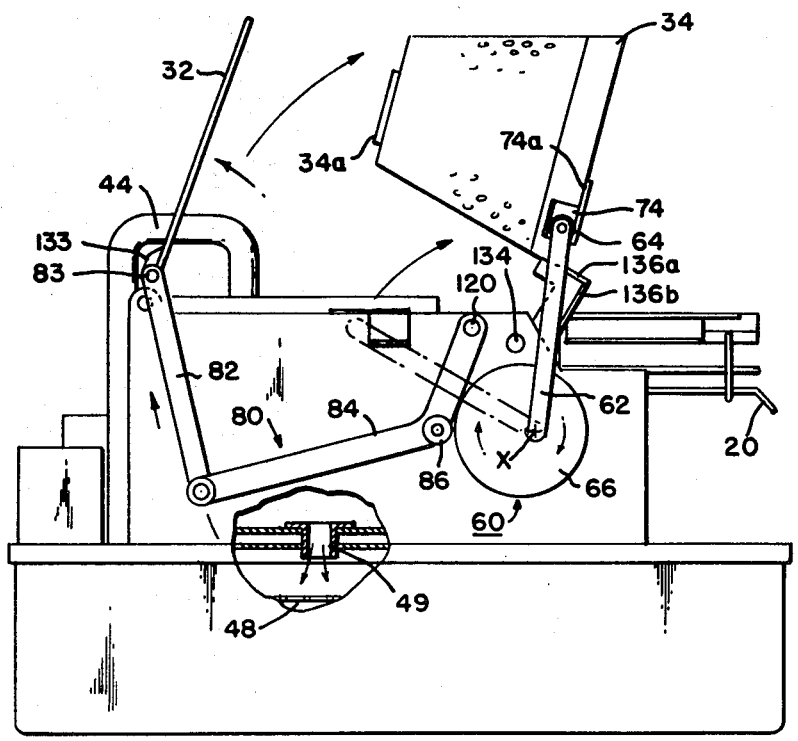

The linkage mechanism 60 also functions to open the lid 32 and remove the cooked food from the frying vat. When a predetermined frying time for the particular food product being fried has expired, a timing mechanism will actuate the motor 68 which will rotate the linkage system 62 to remove the cooked food from the frying vat. The dumping arm 62 is rotated clockwise as seen in FIG. 16. As seen in FIG. 17, the cam wheel 66 will again engage the lid linkage 80 to raise the lid 34 as described above. The dumping rod 62 will engage the top rail 74a of a dumping guide 74 which is attached to the frying basket 34. The roller 64 will slide within the dumping guide 74 and cause the frying basket 34 to rise as it rotates about basket rod 134. When the frying basket 34 reaches the position illustrated in FIG. 17, the food will be dumped into the container C which remains within the receptacle 20. In the preferred embodiment illustrated herein, the motor 68 is programmed in a conventional manner to momentarily stop the basket above the frying basket and rock the frying basket 34 over the food carton after dumping the cooked food into the container as described above.

FIG. 17 also illustrates the drain seal 34a, which is positioned at the bottom of the frying basket 34 to seal the bottom drain 49 during cooking. When the frying basket 34a is raised by the linkage mechanism 60, the oil O from the frying station 30 will rapidly drain thereby flushing the vat to avoid particle buildup.

After the food product is dumped into the cartridge, a time activated signal (buzzer and/or light) indicates to the user to open the door 12 and remove the cartridge. The cartridge may then be used as a serving dish or the top can be replaced and the cartridge used as a storage container keeping the product warm and clean.

Although the automatic french fry making machine of this invention has been described herein with respect to a particular embodiment it is not intended that the invention be limited to the specific embodiment disclosed herein. It is intended rather, that this invention include all equivalent embodiments which are within the spirit of the invention.

We claim:

1. A method of storing, frying and serving individual-sized portions of food for consumer consumption, comprising the steps of:
   storing the food in an individual sized portion cartridge having a sealed closure;
   removing the cartridge from storage;
   removing the sealed closure to access the food;
   placing the opened cartridge into an automatic frying machine;
   automatically dumping the food from the cartridge into frying medium within the automatic frying machine;
   frying the dumped food, separate from the cartridge, in the frying medium;
   automatically dumping the fried food back into the opened cartridge; and
   removing the cartridge with the fried food therein from the automatic frying machine so that the cartridge will serve as a serving container.

2. The method of claim 1 wherein said step of storing includes freezing the food and storing the frozen food in the cartridge.

3. The method of claim 1 including the step of transporting the cartridge to a consumer accessible facility after removing the cartridge from storage.

4. The method of claim 1 wherein the step of automatically dumping the food into the frying medium includes trapping the cartridge while inverting the cartridge so that only the food within the cartridge falls into the frying medium.

5. A method of frying a portion of food comprising the steps of:
   packaging the food in a container for storage and handling prior to frying;
   inserting the container of food into an automatic frying machine at a location remote from and not communicating with a frying medium within the automatic frying machine;
   actuating automatic means for transporting the container of food to a location near the frying medium and dumping the food within the container into the frying medium;
   frying the food, separate from the container, in the frying medium;
   automatically removing the food from the frying medium and returning it to the container;
   automatically returning the fried food and container to a location remote from the frying medium and accessible to the exterior of the automatic frying machine; and
   removing the container and food therein from the automatic frying machine.

6. The method of claim 5 wherein the food is packaged in a sealed container having a removable top thereon, and additionally including the step of removing the top from the container prior to inserting the container into the automatic French frying machine.

* * * * *